(12) United States Patent
Hegde et al.

(10) Patent No.: US 10,904,135 B2
(45) Date of Patent: Jan. 26, 2021

(54) METHOD AND APPARATUS FOR INCREASING RELIABILITY OF PACKET DELIVERY BY DYNAMIC PACKET CLONING AND ROUTE SELECTION

(71) Applicant: NOKIA TECHNOLOGIES OY, Espoo (FI)

(72) Inventors: Chinmaya S. Hegde, Bengaluru (IN); Niraj Nanavaty, Bangalore (IN); Raghunath K S, Bengaluru (IN); Vijayakumar Rajaram Tawker, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 170 days.

(21) Appl. No.: 16/035,279

(22) Filed: Jul. 13, 2018

(65) Prior Publication Data
US 2020/0021513 A1 Jan. 16, 2020

(51) Int. Cl.
*H04L 12/761* (2013.01)
*H04L 12/26* (2006.01)
(Continued)

(52) U.S. Cl.
CPC .......... *H04L 45/16* (2013.01); *H04L 43/0805* (2013.01); *H04L 45/22* (2013.01); *H04L 45/24* (2013.01); *H04L 45/74* (2013.01)

(58) Field of Classification Search
CPC . H04L 43/08; H04L 43/0805; H04L 43/0835; H04L 45/16; H04L 45/22;
(Continued)

(56) References Cited

U.S. PATENT DOCUMENTS

| 7,188,189 | B2 * | 3/2007 | Karol | H04L 63/0227 370/351 |
| 7,321,551 | B2 * | 1/2008 | Dombkowski | H04L 45/121 370/216 |

(Continued)

FOREIGN PATENT DOCUMENTS

WO    WO 2017/182927 A1    10/2017

OTHER PUBLICATIONS

"Internet Protocol DARPA Internet Program Protocol Specification", Information Sciences Institute, University of Southern California (Sep. 1981) 50 pages.
(Continued)

*Primary Examiner* — Ahmed Elallam
(74) *Attorney, Agent, or Firm* — Kramer Amado, P.C.

(57) ABSTRACT

Various embodiments relate to a method for increasing the reliability of a packet delivery by using dynamic packet cloning on a source node and an intermediate node, the method comprising the steps of calculating an achieved reliability, calculating a calculated reliability using the achieved reliability, determining which of a plurality of first routes that have a reliability greater than the calculated reliability, selecting a first route from the determined first routes wherein the selected first route has the lowest reliability of the determined first routes, when there is at least one determined first routes, selecting a first route from the plurality of first routes wherein the selected first route has highest reliability of the plurality of first routes, when there are no determined first routes, updating a required reliability in the packet header to the reliability of the selected first route and sending the packet on the selected first route.

20 Claims, 3 Drawing Sheets

(51) Int. Cl.
*H04L 12/707* (2013.01)
*H04L 12/741* (2013.01)
*H04W 40/18* (2009.01)

(58) Field of Classification Search
CPC ....... H04L 45/24; H04L 45/74; H04L 45/302; H04L 45/566; H04L 45/14
See application file for complete search history.

(56) References Cited

U.S. PATENT DOCUMENTS

| | | | | |
|---|---|---|---|---|
| 7,406,082 | B2* | 7/2008 | Nagarajan | H04L 45/00 370/394 |
| 7,590,756 | B2* | 9/2009 | Chan | H04L 1/08 370/225 |
| 7,979,582 | B2* | 7/2011 | Okazaki | H04L 29/12028 709/245 |
| 8,451,817 | B2* | 5/2013 | Cheriton | H04L 47/10 370/349 |
| 8,861,520 | B1 | 10/2014 | Signaoff et al. | |
| 9,385,952 | B2* | 7/2016 | Blessing | H04L 45/74 |
| 9,755,789 | B2* | 9/2017 | Panattu | H04L 41/5009 |
| 9,871,720 | B1 | 1/2018 | Tillotson | |
| 9,887,874 | B2* | 2/2018 | Vasseur | H04L 43/062 |
| 10,225,751 | B1* | 3/2019 | Liu | H04W 24/04 |
| 10,367,712 | B2* | 7/2019 | Singh | H04L 43/16 |
| 10,389,639 | B1* | 8/2019 | Matthews | H04L 45/24 |
| 10,389,643 | B1* | 8/2019 | Matthews | H04L 43/0882 |
| 10,587,495 | B2* | 3/2020 | Dutta | H04L 45/16 |
| 2004/0199662 | A1* | 10/2004 | Karol | H04L 63/0227 709/238 |
| 2006/0256768 | A1* | 11/2006 | Chan | H04L 1/08 709/238 |
| 2010/0008251 | A1* | 1/2010 | Bender | H04L 1/0057 370/252 |
| 2012/0033552 | A1* | 2/2012 | Dasylva | H04L 12/185 370/230 |
| 2013/0132603 | A1* | 5/2013 | Cohen | H04L 1/1841 709/231 |
| 2013/0132604 | A1* | 5/2013 | Cohen | H04W 76/15 709/231 |
| 2013/0148503 | A1* | 6/2013 | Hutchison | H04L 43/50 370/235 |
| 2015/0016265 | A1* | 1/2015 | Ahmadi | H04W 28/0205 370/235 |
| 2016/0112321 | A1* | 4/2016 | Ibuki | H04L 1/1825 370/236 |
| 2017/0149535 | A1 | 5/2017 | Panattu et al. | |
| 2017/0222920 | A1 | 8/2017 | Thubert et al. | |
| 2018/0048567 | A1* | 2/2018 | Ignatchenko | H04L 43/0894 |
| 2018/0139131 | A1* | 5/2018 | Ignatchenko | H04L 43/10 |
| 2018/0270139 | A1* | 9/2018 | Singh | H04L 43/16 |
| 2018/0367288 | A1* | 12/2018 | Vrzic | H04L 12/403 |
| 2019/0239112 | A1* | 8/2019 | Rao | H04W 4/40 |
| 2019/0253927 | A1* | 8/2019 | Mok | H04W 28/0278 |

OTHER PUBLICATIONS

Begen, et al., "Duplicating RTP Streams", https://tools.ietf.org/html/rfc7198. pp. 1-13.

Clark, "Policy Routing in Internet Protocols", M.I.T. Laboratory for Computer Science, May 1989. pp. 1-22 (https://tools.ietf.org/html/rfc1102).

Deering, et al., "Internet Protocol, Version 6 (IPv6) Specification", The Internet Society (1998). pp. 1-39.

Ford, et al., "TCP Extensions for Multipath Operation with Multiple Addresses", (https://tools.ietf.org/html/rfc6824) pp. 1-64.

Rentschler, et al., "The Parallel Redundancy Protocol for Industrial IP Networks", (http://wwwlehre.dhbw-stuttgart.de/~rentschler/Publications/ICIT2013_PRP_Routing_pdf.) 6 pages.

"Burst Cloning: a proactive scheme to reduce data loss in optical burst-switched networks," Communications, 2005, ICCC 2005, 2005 ICCC International Conference on May 16-20, 2005.

Patentablity Search Report for "A method for increasing reliability of packets to desired leveal by dynamic packet cloning and route selection," NC 105138 dated Mar. 20, 2018, Effectual Services.

\* cited by examiner

METHOD AND APPARATUS FOR INCREASING RELIABILITY OF PACKET DELIVERY BY DYNAMIC PACKET CLONING AND ROUTE SELECTION

TECHNICAL FIELD

This disclosure relates generally to packet delivery, and more specifically, but not exclusively, to increasing the reliability of packet delivery by using dynamic packet cloning and route selection.

BACKGROUND

The reliability of packet transmission over a network has been a known issue since packet based data transmission was utilized. There have been several mechanisms proposed and implemented to improve the reliability of packet transmission over a network.

These mechanisms include usage of acknowledgement messages (transmission control protocol "TCP"), redundant links (parallel redundancy protocol "PRP"), redundant streams (real-time transport protocol "RTP", multi-path-TCP), etc. These existing mechanisms are challenged by the ultra-reliability requirements of many 5G use cases.

SUMMARY

A brief summary of various embodiments is presented below. Embodiments address a method and apparatus for increasing reliability of packet delivery by dynamic packet cloning and route selection.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments relate to a method for increasing the reliability of a packet delivery by using dynamic packet cloning on a source node and an intermediate node, the method including the steps of calculating an achieved reliability, calculating a calculated reliability using the achieved reliability, determining which of a plurality of first routes that have a reliability greater than the calculated reliability, selecting a first route from the determined first routes wherein the selected first route has the lowest reliability of the determined first routes, when there is at least one determined first routes, selecting a first route from the plurality of first routes wherein the selected first route has highest reliability of the plurality of first routes, when there are no determined first routes, updating a required reliability in the packet header to the reliability of the selected first route, and sending the packet on the selected first route.

In an embodiment of the present disclosure, the method for increasing the reliability of a packet delivery by using dynamic packet cloning on the source node and the intermediate node of, the method further including determining whether an expected reliability has been met.

In an embodiment of the present disclosure, the method for increasing the reliability of a packet delivery by using dynamic packet cloning on the source node and the intermediate node of, the method further including determining whether the plurality of first routes to a destination node exist when the expected reliability has not been met.

In an embodiment of the present disclosure, the method for increasing the reliability of a packet delivery by using dynamic packet cloning on the source node and the intermediate node of, the method further including determining whether a current packet cloning level is greater than or equal to a maximum packet cloning level when the plurality of routes to the destination node exist.

In an embodiment of the present disclosure, the method for increasing the reliability of a packet delivery by using dynamic packet cloning on the source node and the intermediate node of, the method further including cloning the packet when the current packet cloning level is less than the maximum packet cloning level.

In an embodiment of the present disclosure, the method for increasing the reliability of a packet delivery by using dynamic packet cloning on the source node and the intermediate node of, the method further including incrementing the current packet cloning level in the packet header after cloning the packet.

In an embodiment of the present disclosure, the method for increasing the reliability of a packet delivery by using dynamic packet cloning on the source node and the intermediate node of, the method further including calculating an achieved reliability, calculating a calculated reliability using the achieved reliability, determining which of a plurality of second routes that have a reliability greater than the calculated reliability, selecting a second route from the determined second routes wherein the selected second route has the lowest reliability of the determined second routes, when there is at least one determined second routes, selecting a second route from the plurality of second routes wherein the selected second route has highest reliability of the plurality of second routes, when there are no determined second routes, updating a required reliability in the packet header to the reliability of the selected second route, and sending the packet on the selected second route.

In an embodiment of the present disclosure, the achieved reliability is calculated by $p_{ach_j}=1-\Pi_{k=0}^{j-1}(1-p_{P_k})$, where $P_k$ is a Route Selected by the Algorithm in Iteration k, where k takes values from 0 to j−1 and where $p_{P_k}$ is a reliability of $P_k$.

In an embodiment of the present disclosure, the calculated reliability is calculated by $$p_{cal_j} = 1 - \frac{(1 - p_{req})}{(1 - p_{ach_j})},$$

where $p_{req}$ is the required reliability and $P_{ach_j}$ is the achieved reliability.

In an embodiment of the present disclosure, the packet header includes the current packet cloning level, the maximum packet cloning level and the required reliability.

Various embodiments relate to a network node for increasing the reliability of a packet delivery by using dynamic packet cloning, the source node and the intermediate node including a memory; and a processor configured to calculate an achieved reliability, calculate a calculated reliability using the achieved reliability, determine which of a plurality of first routes that have a reliability greater than the calculated reliability, select a first route from the determined first routes wherein the selected first route has the lowest reliability of the determined first routes, when there is at least one determined first routes, select a first route from the plurality of first routes wherein the selected first route has highest reliability of the plurality of first routes, when there are no determined first routes, update a required reliability in the packet header to the reliability of the selected first route, and send the packet on the selected first route.

In an embodiment of the present disclosure, the network node for increasing the reliability of a packet delivery by using dynamic packet cloning, the processor further configured to determine whether the expected reliability has been met.

In an embodiment of the present disclosure, the network node for increasing the reliability of a packet delivery by using dynamic packet cloning, the processor further configured to determine whether the plurality of routes to a destination node exist when the expected reliability has not been met.

In an embodiment of the present disclosure, the network node for increasing the reliability of a packet delivery by using dynamic packet cloning, the processor further configured to determine whether a current packet cloning level is greater than or equal to a maximum packet cloning level when the plurality of routes to the destination node exist.

In an embodiment of the present disclosure, the network node for increasing the reliability of a packet delivery by using dynamic packet cloning, the processor further configured to clone the packet when the current packet cloning level is less than the maximum packet cloning level.

In an embodiment of the present disclosure, the network node for increasing the reliability of a packet delivery by using dynamic packet cloning, the processor further configured to increment the current packet cloning level in the packet header after cloning the packet.

In an embodiment of the present disclosure, the network node for increasing the reliability of a packet delivery by using dynamic packet cloning, the processor further configured to calculate an achieved reliability, calculate a calculated reliability using the achieved reliability, determine which of a plurality of second routes that have a reliability greater than the calculated reliability, select a second route from the determined second routes wherein the selected second route has the lowest reliability of the determined second routes, when there is at least one determined second routes, select a second route from the plurality of second routes wherein the selected second route has highest reliability of the plurality of second routes, when there are no determined second routes, update a required reliability in the packet header to the reliability of the selected second route, and send the packet on the selected second route.

In an embodiment of the present disclosure, the achieved reliability is calculated by $p_{ach_j} = 1 - \Pi_{k=0}^{j-1}(1-p_{P_k})$, where $P_k$ is a route selected by the algorithm in iteration k, where k takes values from 0 to j−1 and where $p_{P_k}$ is a reliability of $P_k$.

In an embodiment of the present disclosure, the calculated reliability is calculated by $$p_{cal_j} = 1 - \frac{(1-p_{req})}{(1-p_{ach_j})},$$

where $p_{req}$ is the required reliability and $p_{ach_j}$ is the achieved reliability.

In an embodiment of the present disclosure, the packet header includes the current packet cloning level, the maximum packet cloning level and the required reliability.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

There is a need to create a packet delivery method which provides increased reliability as compared to the existing mechanisms for packet transmission.

The current embodiment describes a mechanism to clone packets "on-the-way" to increase the reliability of the packet transmission to the "required" level, without increasing the inherent reliability of the links or the routers. The current embodiment may be applied to any existing and future network structures.

The required level of packet reliability is determined by the use case requirements. For example, a high degree of reliability of packets transmission is required for 5G use cases.

As discussed above, there are several known mechanisms which are currently being used to increase packet reliability.

For example, PRP which is a mechanism where a source node (double attached node implementing PRP "DANP") simultaneously sends two copies of a frame, one over each port. The two frames travel through their respective local area networks ("LANs") until they reach a destination node ("DANP") with a certain time skew. The destination node accepts the first frame of a pair and discards the second, when/if it arrives at the destination node. Therefore, as long as one LAN is operational, the destination application always receives one frame. The PRP mechanism provides zero-time recovery and allows the network to continuously check the redundancy to detect failures.

However, the PRP mechanism is used for a L2 protocol and is not suited for L3 networks.

Policy-based routing is another mechanism which is routing based on policies that define how to handle packets originating from particular sources and being transmitted to a particular destination. Policies may be based on the size of the packet, the protocol of the payload, or other information available in a packet header or payload. This permits routing of packets originating from different sources to different networks even when the destination of the packets is the same.

However, policy based routing cannot be used to attain arbitrarily high levels of reliability as the reliability of the packet is limited by the reliability of the route.

Spatial duplication and temporal duplication at layer 4 for RTP is another mechanism, however, this mechanism is limited to applications using RTP.

TCP which addresses reliability by using acknowledgement packets is another mechanism. Latency may be higher using acknowledgment messages because of the response packets and the window used for retransmission.

TCP extensions for multipath operation with multiple addresses is another mechanism which uses multiple paths for higher reliability, however, there is no coverage of how to decide on the number of paths and what is the expected reliability improvement. Further, additional IP addresses are needed for the source and destination nodes, which would need additional signaling at the TCP level, and which is specific to the TCP transport layer.

Other known technologies, such as global system for mobile communications ("GSM" and asynchronous transfer mode ("ATM"), use partly or fully circuit-switched hops to attain higher reliability, however, circuit switched hops may be more expensive and difficult to change.

Another mechanism is the allocation of dedicated resources to achieve higher reliability, however, this mechanism is expensive and inflexible.

The current embodiment is directed towards a method for improving the reliability of delivering a packet to a destination by dynamic/selective cloning of a packet and route selection at the source node or in a router.

In order to achieve the improved reliability of packet transmission, three fields are added to the IP header of the packet. These three fields include a current packet cloning level field, a max packet cloning level field and a required reliability field. If the source node or a router decides to fragment the packet, these fields should be copied to all the fragments.

For IPv4 headers, the fields will be placed in the options data, specifically, the required reliability will be 16 bits. The current packet cloning level will be 8 bits and the maximum packet cloning level will be 8 bits. The number of bits assigned to each of these fields may also take other values as well depending on the specific requirements for the values of each of the fields and the number of bits available in the optional data portion of the header.

Any router that does not support these fields in the IPv4 optional header should not discard the packet or the fields, but it should transparently forward the packet with these fields.

For IPv6 headers, the current cloning level will be 8 bits, the maximum cloning level will be 8 bits, the required reliability will be 16 bits and the padding will be 8 bits. Likewise, the number of bits assigned to each these fields may also take other values as well depending on the specific requirements for the values of each of the fields and the number of bits available in the optional data portion of the header.

Any router that does not support these fields in the IPv6 optional header should not discard the packet or the fields, but it should transparently forward the packet with these fields.

Paths, disjoint paths and reliability of each path for a given quality of service ("QoS") value are tracked using existing internet routing protocols and a routing table with that data is available, sorted in descending order of reliability, to the network.

For example, suppose that the reliability of a particular path in the network, on the routing table, is 0.99. A reliability of 0.99 is defined as 99 out of 100 packets reach the destination node from the source node, meaning 1 packet may be dropped. Therefore, the unreliability value of the path would be 0.01.

However, if the network had two paths with unreliability values of 0.01 (1 packet drop in 100 packets), the overall reliability would be 1 packet drop in 10,000 packet transmissions. Therefore, the reliability increases.

Depending on the desired reliability, multiple copies of the packet may be sent in as many paths. Using this approach, the reliability increases.

In addition, by using the method of the current embodiment, the latency may decrease per packet, as the overall latency is the latency of the fastest received copy.

Further, network traffic will increase as many times as the number of cloned packets. Therefore, the method of the current embodiment may be used if bandwidth is available on the network.

Central processing unit ("CPU") consumption on the destination node may increase, although not at the same rate as the increased network traffic, as the extra packets only need to be identified and dropped by the destination node.

In the current embodiment, there may be relay nodes and/or routers which may, en-route between the source node and the destination node, determine that additional clones of the packets must be sent.

The determination to send additional clones of the packets is made if the current packet cloning level is less than the max packet cloning level and the desired reliability is not reached.

Relay nodes may decide to change the QoS of the packet to give it higher reliability.

The max packet cloning level field limits the total number of copies of a packet in the network. This will limit the maximum reliability of the overall multi-path.

If the required reliability cannot be achieved on the given network, more paths may be added to the network, to meet the reliability level required on the network.

The value of the max packet cloning level field may be configured manually at the source node or centrally via a software defined network ("SDN") controller. For any packet, the max packet cloning level may be set only at the source node and may not be modified by any other nodes in the network.

Figure 1:
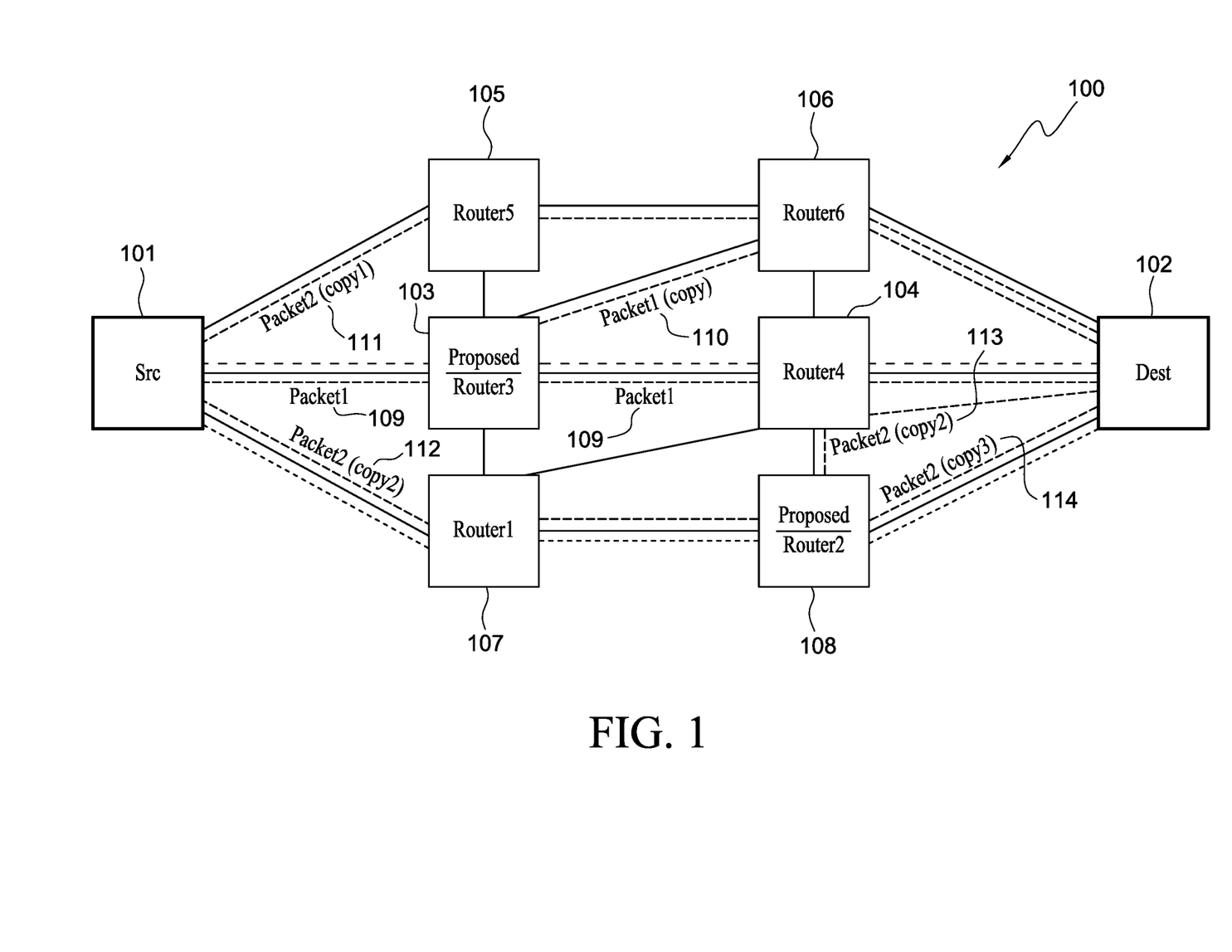
FIG. 1 illustrates a block diagram of a network layout of the current embodiment including a source node and a destination node.

FIG. 1 illustrates a block diagram of a network 100 layout of the current embodiment including a source node 101 and a destination node 102.

When a single packet is sent, the source node 101 may determine that there is at least one path in the network 100 with a reliability value which meets the required reliability of the packet over the network 100 and therefore, the source node 101 sends the packet on that path (not illustrated).

However, FIG. 1 illustrates an example of a set of routes from the source node to the destination node in which multiple copies of a packet are sent to achieve the required reliability because no single path meets the required reliability.

For example, FIG. 1 illustrates Packet1 109 being transmitted from the source node 101 to Router3 103. As discussed above, Router3 103, acting as a relay node and/or router determines that additional clones of the Packet1 109 must be sent. Therefore, Router3 103 determines that one clone of Packet1 109 must be created, and therefore Packet1 (copy) 110 is created. Router3 103 transmits Packet1 109 to Router4 104 and Router3 103 transmits Packet 1 (copy) 110 to Router6 106. Router4 104 then transmits Packet1 109 to destination node 102. Router6 106 transmits Packet1 (copy) 110 to destination node 102. The destination node 102 then identifies and drops the extra packets.

For example, FIG. 1 illustrates two copies of Packet2 being transmitted from the source node 101, Packet2 (copy1) 111 and Packet2 (copy2) 112. Packet2 (copy1) 111 is transmitted from the source node 101 to Router5 105 then transmitted to Router6 106 and then to destination node 102. Packet2 (copy2) 112 is transmitted from the source node 101 to Router1 107 then to Router2 108 which acts as a relay node and/or router and determines that additional clones of the Packet2 (copy2) 112 must be sent. Router2 108 determines that two clones must be created, therefore, Packet2 (copy2) 113 and Packet2 (copy3) 114 are created. Packet2 (copy2) 113 is sent from Router2 108 to Router4 104 then to destination node 102. Packet2 (copy3) 114 is sent from Router2 108 to destination node 102.

The source node 101 determines that all available individual paths do not meet the required reliability (i.e., finds that the overall multipath is not good enough to support the required reliability); however, the source node determines the subset of available paths which, together, may meet required reliability. The source node 101 then sends multiple clones of the packet on this set of paths to ensure the required reliability for the network is met.

The source node 101 may consider increasing the maximum packet cloning level field in order to increase reliability of the packet transmission and setting the maximum value for the maximum cloning level field may be set manually or via an SDN controller.

The router node (i.e., the relay node) determines that there is not a single path which has the required reliability to route the packet to the destination, but there exists a multipath which can provide the required reliability, between the router and the destination, and if the current packet cloning level is less than the max cloning level, then the router node sends multiple copies of the packet on this set of paths to meet the required reliability. However, if the current packet cloning level is equal to the maximum packet cloning level, the router can only forward the packet.

Figure 2:
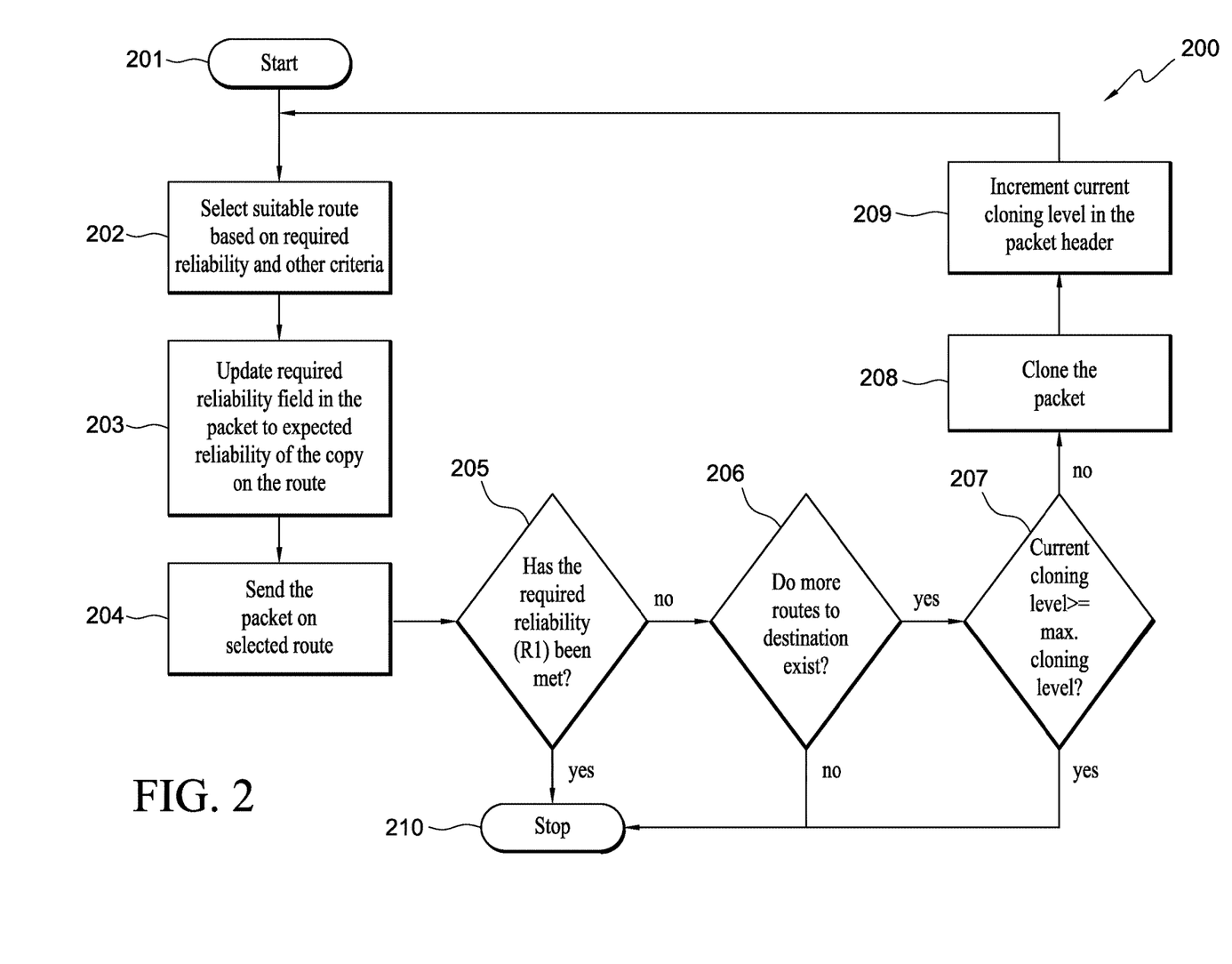
FIG. 2 illustrates a flow diagram of the method for packet cloning of the current embodiment.

FIG. 2 illustrates a flow diagram of the method 200 for packet cloning, at a particular node, other than the destination node, of the current embodiment.

The method 200 begins at step 201. The method 200 proceeds to step 202 which selects a route based on required reliability and other criteria. At the source node, the required reliability is from a higher layer, however, at an intermediate node (i.e. relay node), the required reliability is from the previous node.

The method 200 then proceeds from step 202 to step 203 which updates the required reliability field in the packet to the reliability expected for the copy of the packet on the selected route. Before the packet is sent, which is step 204, the required reliability field in the copy of the packet is updated to the reliability of the selected route.

The method 200 then proceeds from step 203 to step 204 which sends the packet on the selected route.

The method 200 then proceeds from step 204 to step 205 which determines whether the required reliability has been met. If yes, the method 200 proceeds to end at step 210. If no, the method 200 proceeds to step 206. Only one copy of the packet may be sent to the destination per iteration of the method 200.

Step 206 determines whether more routes exist to the destination node. If no, the method 200 proceeds to end at step 210. If yes, the method 200 proceeds to step 207.

Step 207 determines whether the current packet cloning level is greater than or equal to the maximum packet cloning level. If yes, the method 200 proceeds to step 210. If no, the method proceeds to step 208.

Step 208 clones the packet. The method 200 proceeds from step 208 to step 209 which increments the current packet cloning level in the packet header.

The method iterates back to step 202.

The algorithm used for selecting the route for any iteration "j", on a particular node other than the destination node, is illustrated below. The assumption in this algorithm is that the routing table is sorted in descending order of reliability for a given pair of source and destination nodes.

The algorithm includes the following variables: $p_{req}$ is the required reliability before iteration 0, which is the required reliability for the packet to be transmitted on the network. j is the current iteration number. $p_i$ is the reliability of route 'i' and the routing table is used to store $p_i$ for each route. $P_j$ is the selected route in iteration 'j'. k is any iteration before iteration 'j', therefore, 'k' may be any value from 0 to j−1. $P_k$ is the selected route in iteration k. $p_{P_k}$ is the reliability of route $P_k$, meaning the reliability of the route selected in iteration k, which may be any of the iterations prior (0 . . . j−1) to the current iteration T on a particular node. $p_{ach_j}$ is the achieved reliability until the start of iteration 'j', which is the reliability that has been achieved until iteration j. $p_{cal_j}$ is the calculated reliability which is the required reliability at iteration 'j' in order to meet the required reliability $p_{req}$. $P_j$ is the selected route in iteration j. N is the number of available routes for a given pair of source and destination nodes.

The steps of the algorithm include that:

If j=0, $p_{cal_j} = p_{req}$.

Otherwise, the algorithm calculates $p_{ach_j}$, $p_{cal_j}$ as follows:

$$p_{ach_j} = 1 - \prod_{k=0}^{j-1}(1 - p_{P_k}).$$

$$p_{cal_j} = 1 - \frac{(1 - p_{req})}{(1 - p_{ach_j})}.$$

Then, the algorithm selects a route i such that, if any $p_i$ then $(p_j - p_{cal_j})$ is minimized. Else, $(p_{cal_j} - p_i)$ is minimized. This may be alternatively described as follows. The algorithm determines all of the routes from the set of routes where the reliability is greater than or equal to the calculated reliability (i.e., $p_i \geq p_{cal_j}$). From those determined routes, the route with the lowest reliability is selected when there is at least one determined first routes. However, when none of the routes from among the set of routes has a reliability which is greater than or equal to the calculated reliability (i.e., all of the routes from among the set of routes have reliability less than the calculated reliability), the algorithm selects the route with the highest reliability when there are no determined first routes.

$$P_j = i.$$

Then, the algorithm removes route $P_j$ from the search space.

Once the packets reach the destination node 102, the duplicate copies are discarded.

The current embodiment may be used on existing and future networks to provide significantly higher reliability, at the cost of network bandwidth, with or without changes in existing QoS values.

Figure 3:
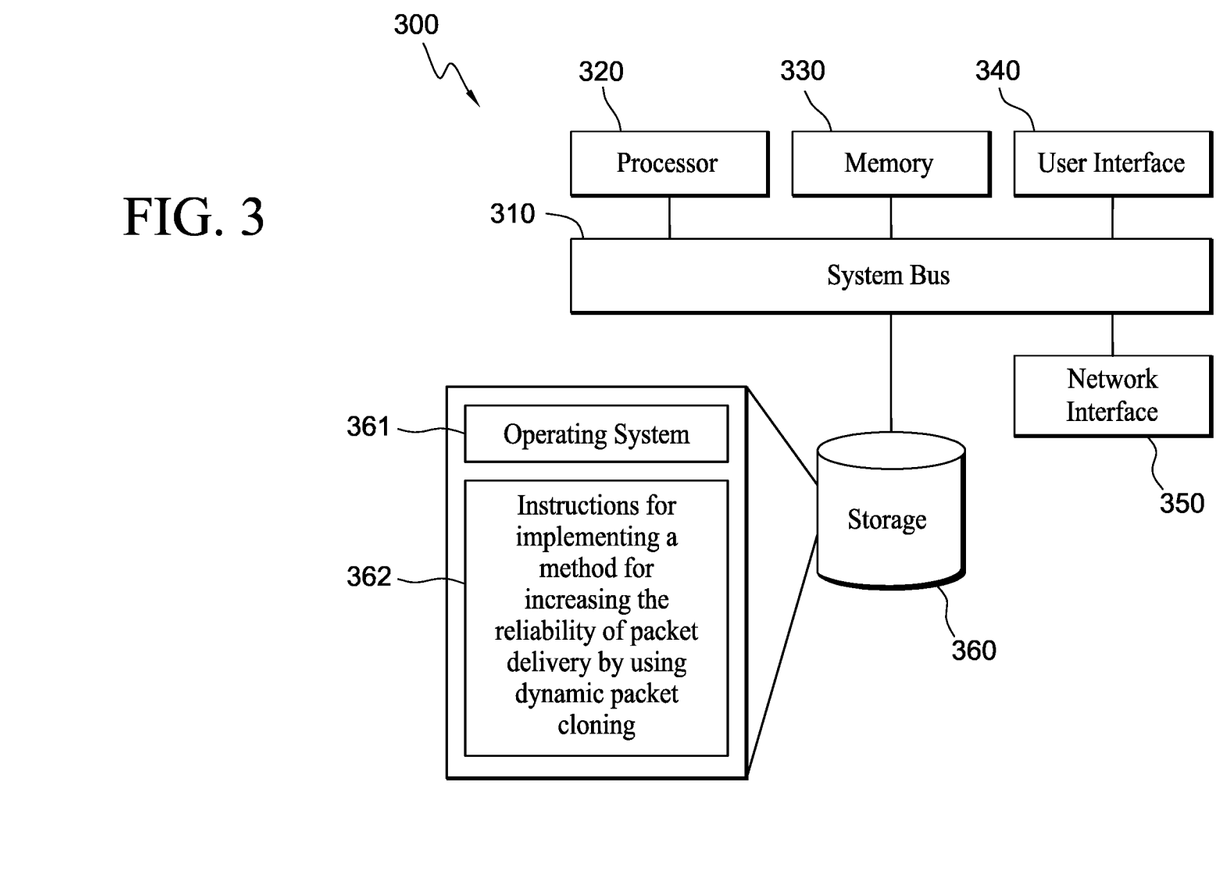
FIG. 3 illustrates a block diagram of a real-time data processing system of the current embodiment.

FIG. 3 illustrates an exemplary hardware diagram 300 for implementing a source node or a router. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands. The user interface may also include touch or gesture controlled devices. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300 and instructions for implementing a method for increasing the reliability of packet delivery by using dynamic packet cloning 362.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered "non-transitory machine-readable media." As used herein, the term "non-transitory" will be understood to exclude transitory signals but to include all forms of storage, including both volatile and non-volatile memories.

While the host device 300 is shown as including one of each described component, the may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for increasing reliability of packet delivery comprising:
   calculating, for each route of a plurality of first routes, an achieved reliability;
   obtaining a required reliability from a packet header;
   calculating, for each route of the plurality of first routes, a calculated reliability based upon both the achieved reliability and the required reliability;
   comparing a respective reliability of each route of the plurality of first routes to the calculated reliability;
   after determining that a subset of the plurality of first routes have respective reliabilities greater than the calculated reliability, selecting a first route from the subset, wherein the selected first route has a lowest reliability of the subset;
   after determining that none of the plurality of first routes have respective reliabilities greater than the calculated reliability, selecting a first route from the plurality of first routes wherein the selected first route has a highest reliability of the plurality of first routes;
   updating the required reliability in the packet header to the reliability of the selected first route, and
   sending the packet on the selected first route.

2. The method of claim 1, further comprising:
   determining whether an expected reliability has been met.

3. The method of claim 2, further comprising:
   determining whether the plurality of first routes to a destination node exist when the expected reliability has not been met.

4. The method of claim 3, further comprising:
   determining whether a current packet cloning level is greater than or equal to a maximum packet cloning level when the plurality of routes to the destination node exist.

5. The method of claim 4, further comprising:
   cloning the packet when the current packet cloning level is less than the maximum packet cloning level.

6. The method of claim 5, further comprising:
   incrementing the current packet cloning level in the packet header after cloning the packet.

7. The method of claim 6, further comprising:
   calculating, for each route of a plurality of second routes, an achieved reliability;
   calculating, for each route of the plurality of first routes, a calculated reliability based upon both the achieved reliability and the required reliability;
   comparing a respective reliability of each route of the plurality of second routes to the calculated reliability;
   after determining that a subset of the plurality of second routes have respective reliabilities greater than the calculated reliability, selecting a second route from the subset wherein the selected second route has a lowest reliability of the subset;
   after determining that none of the plurality of first routes have respective reliabilities greater than the calculated reliability, selecting a second route from the plurality of second routes wherein the selected second route has a highest reliability of the plurality of second routes;
   updating the required reliability in the packet header to the reliability of the selected second route, and
   sending the packet on the selected second route.

8. The method of claim 1, wherein the achieved reliability is calculated by $p_{ach_j} = 1 - \Pi_{k=0}^{j-1}(1-p_{P_k})$, where $P_k$ is a route selected in iteration k, where k takes values from 0 to j−1 and where $p_{P_k}$ is a reliability of $P_k$.

9. The method of claim 1, wherein the calculated reliability is calculated by $$p_{cal_j} = 1 - \frac{(1-p_{req})}{(1-p_{ach_j})},$$

where $p_{req}$ is the required reliability and $p_{ach_j}$ is the achieved reliability.

10. The method of claim 1, wherein the packet header includes a current packet cloning level, a maximum packet cloning level, and the required reliability.

11. A network node for increasing reliability of packet delivery comprising:
    a memory; and
    a processor configured to:
       calculate, for each route of a plurality of first routes, an achieved reliability;
       obtain a required reliability from a packet header;
       calculate, for each route of the plurality of first routes, a calculated reliability based upon both the achieved reliability and a required reliability;
       compare a respective reliability of each route of the plurality of first routes to the calculated reliability;
       after determining that a subset of the plurality of first routes have respective reliabilities greater than the calculated reliability, select a first route from the subset, wherein the selected first route has a lowest reliability of the subset;
       after determining that none of the plurality of first routes have respective reliabilities greater than the calculated reliability, select a first route from the plurality of first routes wherein the selected first route has a highest reliability of the plurality of first routes; update the required reliability in the packet header to the reliability of the selected first route, and
       send the packet on the selected first route.

12. The network node of claim 11, wherein the processor is further configured to determine whether the expected reliability has been met.

13. The network node of claim 12, wherein the processor is further configured to determine whether the plurality of routes to a destination node exist when the expected reliability has not been met.

14. The network node of claim 13, wherein the processor is further configured to determine whether a current packet cloning level is greater than or equal to a maximum packet cloning level when the plurality of routes to the destination node exist.

15. The network node of claim 14, wherein the processor is further configured to clone the packet when the current packet cloning level is less than the maximum packet cloning level.

16. The network node of claim 15, wherein the processor is further configured to increment the current packet cloning level in the packet header after cloning the packet.

17. The network node of claim 16, wherein the processor is further configured to:
- calculate, for each route of a plurality of second routes, an achieved reliability;
- calculate, for each route of the plurality of second routes, a calculated reliability based upon both the achieved reliability and the required reliability;
- compare a respective reliability of each route of the plurality of second routes to the calculated reliability;
- after determining that a subset of the plurality of second routes have respective reliabilities greater than the calculated reliability, select a second route from the subset, wherein the selected second route has a lowest reliability of the subset;
- after determining that none of the plurality of second routes have respective reliabilities greater than the calculated reliability, select a second route from the plurality of second routes, wherein the selected second route has a highest reliability of the plurality of second routes;
- update the required reliability in the packet header to the reliability of the selected second route, and
- send the packet on the selected second route.

18. The network node of claim 11, wherein the achieved reliability is calculated by $p_{ach_j} = 1 - \Pi_{k=0}^{j-1}(1-p_{P_k})$, where $P_k$ is a route selected in iteration k, where k takes values from 0 to j−1 and where $p_{P_k}$ is a reliability of $P_k$.

19. The network node of claim 11, wherein the calculated reliability is calculated by $$p_{cal_j} = 1 - \frac{(1-p_{req})}{(1-p_{ach_j})},$$

where $p_{req}$ is the required reliability and $p_{ach_j}$ is the achieved reliability.

20. The network node of claim 11, wherein the packet header includes a current packet cloning level, a maximum packet cloning level, and the required reliability.

* * * * *